Oct. 4, 1927.
A. BLOCK
1,644,229
CREDIT SLIP AUTHORIZING APPARATUS
Filed May 23, 1922     12 Sheets-Sheet 1
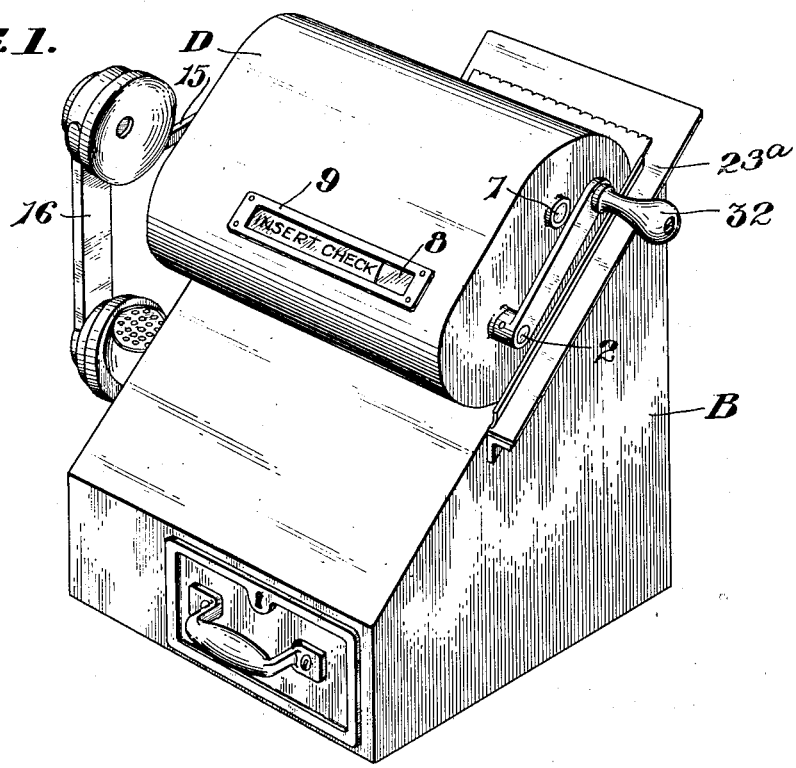
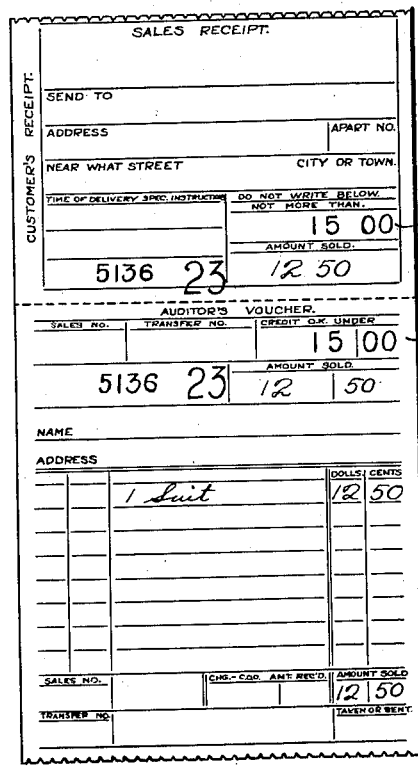
Inventor.
ABRAHAM BLOCK.
by Drury, Strong,
Townsend and Loftus,
Attorneys.

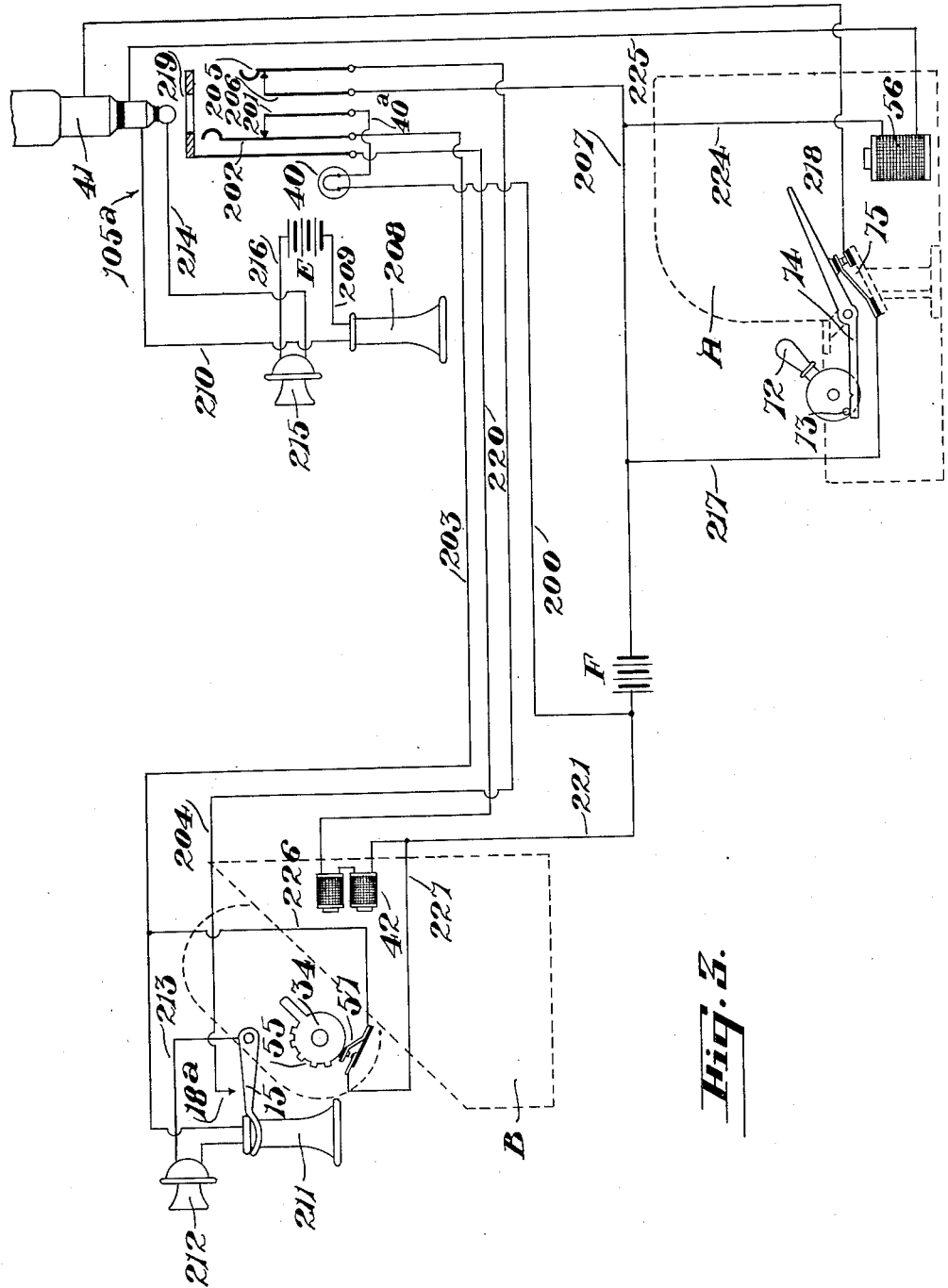

Oct. 4, 1927.
A. BLOCK
1,644,229
CREDIT SLIP AUTHORIZING APPARATUS
Filed May 23, 1922     12 Sheets-Sheet 3
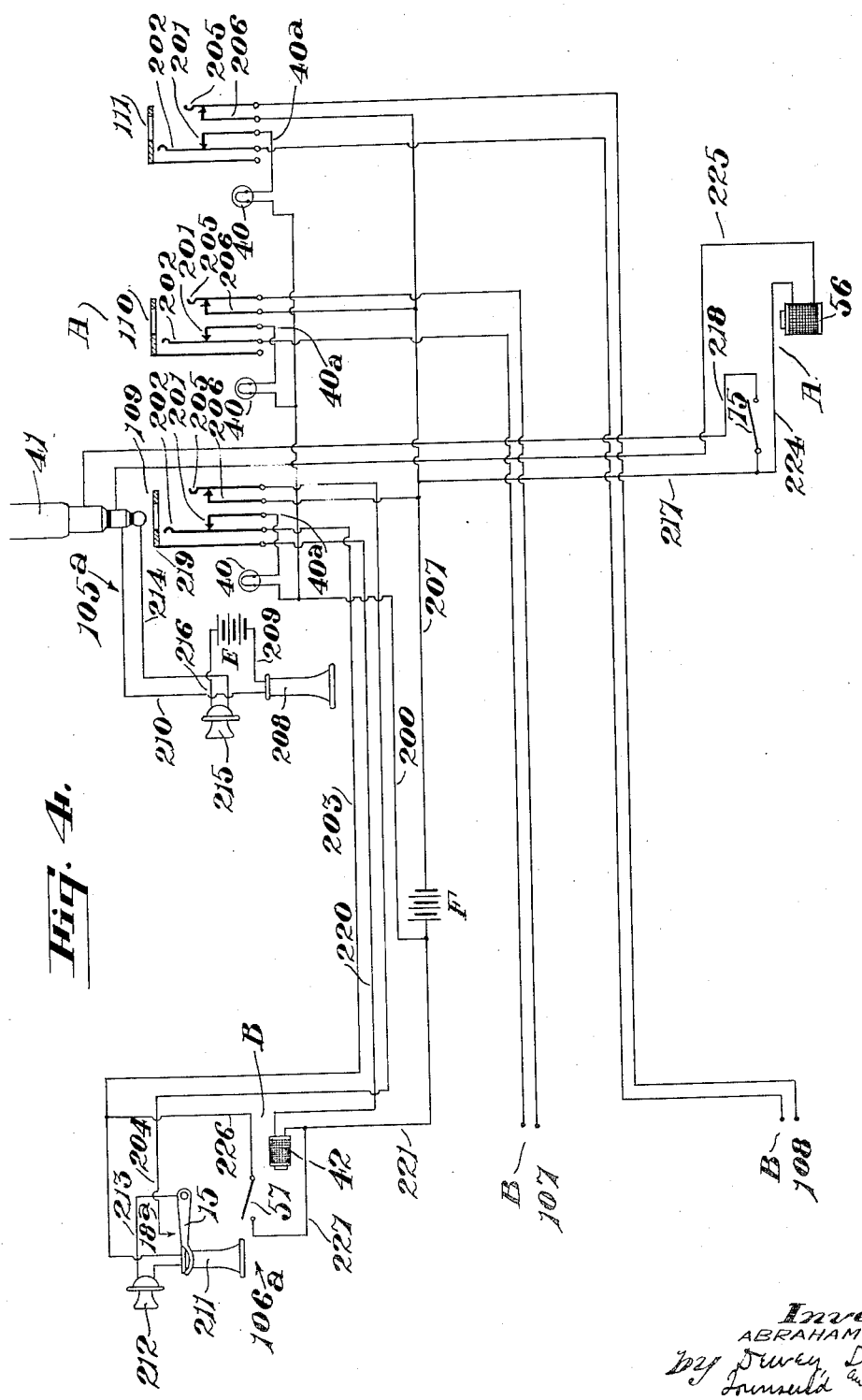
Inventor.
ABRAHAM BLOCK.
By Dewey, Strong,
Townsend and Loftus
Attorneys.

Oct. 4, 1927.

A. BLOCK 1,644,229

CREDIT SLIP AUTHORIZING APPARATUS

Filed May 23, 1922     12 Sheets-Sheet 4

Inventor.
ABRAHAM BLOCK.
By Dewey, Strong,
Townsend and Loftus
Attorneys.

Oct. 4, 1927.  
A. BLOCK  
1,644,229  
CREDIT SLIP AUTHORIZING APPARATUS  
Filed May 23, 1922    12 Sheets-Sheet 8

Inventor.  
ABRAHAM BLOCK.  
by Dewey, Strong,  
Townsend and Loftus  
Attorneys.

Oct. 4, 1927. 1,644,229

A. BLOCK

CREDIT SLIP AUTHORIZING APPARATUS

Filed May 23, 1922   12 Sheets-Sheet 9

Inventor.
ABRAHAM BLOCK.
by Drury Strong
Townsend and Loftus
Attorneys.

Oct. 4, 1927.

A. BLOCK 1,644,229

CREDIT SLIP AUTHORIZING APPARATUS

Filed May 23, 1922   12 Sheets-Sheet 10

Inventor.
ABRAHAM BLOCK.
by Dewey, Strong,
Townsend and Loftus
Attorneys.

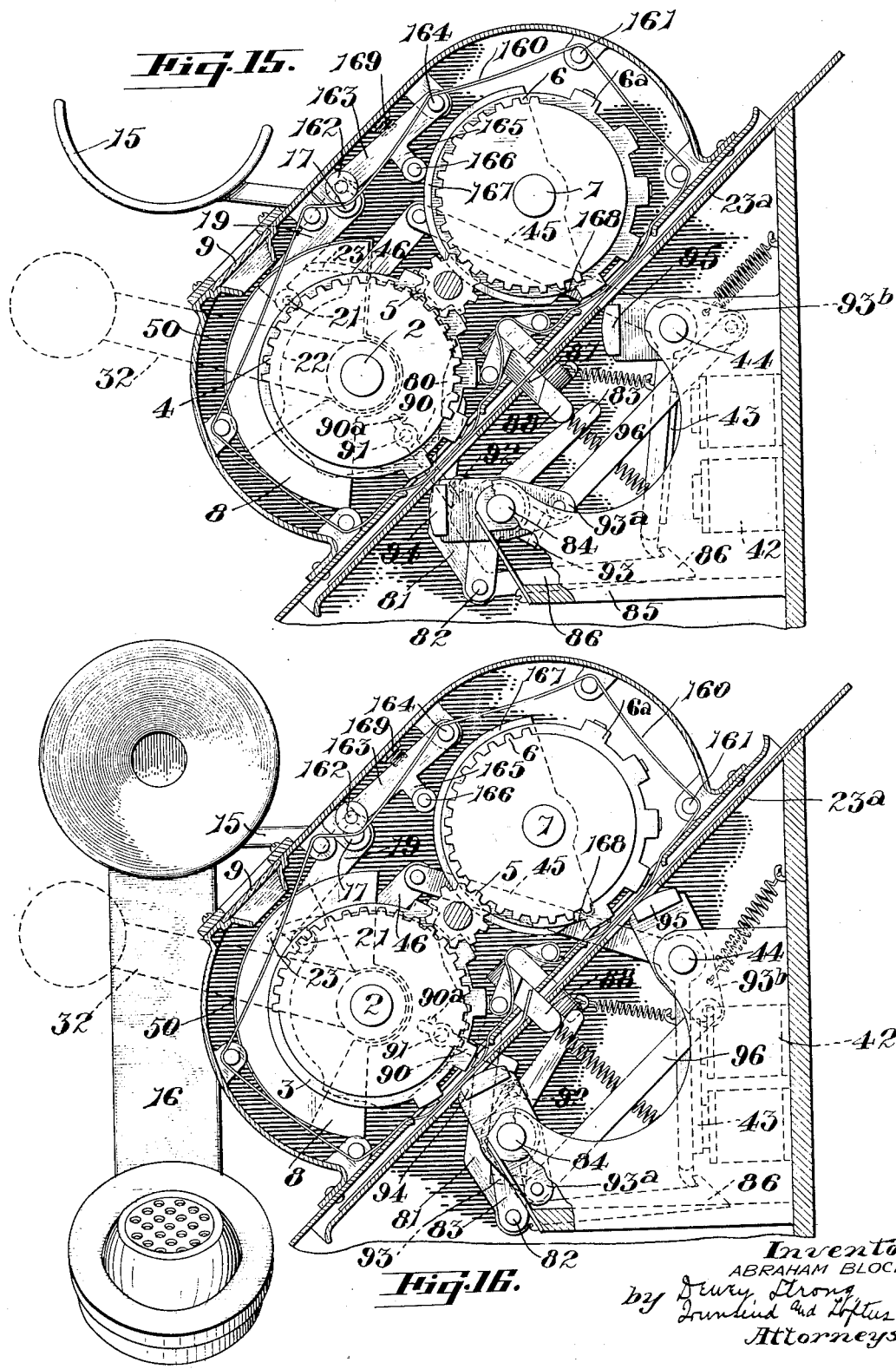

Oct. 4, 1927.

A. BLOCK 1,644,229

CREDIT SLIP AUTHORIZING APPARATUS

Filed May 23, 1922      12 Sheets-Sheet 12

Inventor.
ABRAHAM BLOCK.
by Davey, Strong,
Townsend and Loftin
Attorneys.

Patented Oct. 4, 1927.

1,644,229

UNITED STATES PATENT OFFICE.

ABRAHAM BLOCK, OF SAN FRANCISCO, CALIFORNIA, ASSIGNOR, BY MESNE ASSIGNMENTS, TO THE NATIONAL CASH REGISTER COMPANY, OF DAYTON, OHIO, A CORPORATION OF MARYLAND.

CREDIT-SLIP-AUTHORIZING APPARATUS.

Application filed May 23, 1922. Serial No. 563,139.

This invention relates to credit authorizing apparatus.

At the present time a large percentage of the retail business of department or other large retail stores is transacted through credit or charge transactions, which permits a responsible party to obtain merchandise from the store, at will, on a period payment plan. However, a limit is placed on the amount of credit to be extended to each customer. This limit is determined by the judgment of the store's executives as to the customer's financial standing and responsibility.

To maintain the account within the limitation placed thereon, and to prevent salespersons from extending an excessive amount of credit to customers, it is common practice for a responsible employee of the store to investigate the customer's account and approve each transaction. Should the investigation disclose that the account is in a satisfactory condition, then the transaction is approved and the desired merchandise delivered to the customer. However, if the account is not in proper condition, the customer is invited to call at the office to discuss the same with proper authorities in an endeavor to properly recondition the account. This investigation of the account and the approving of the transaction is commonly termed "authorizing" and the party approving the same is generally known as the "authorizer".

As the result of extensive experimentation it has been found both advantageous and advisable to have each credit transaction referred to a central office where the records of the customers' accounts are accessible either by reference to the account ledgers or an indexed synopsis thereof. It has been ascertained that this centralized authorization system not only affords the store the greatest protection, but minimizes the length of time required to complete the transaction, which accordingly adds to the efficiency of the salespersons and to the convenience of the patron.

At the present time there are two systems of centralized authorization commonly employed. In both of these the salesperson fills out the usual salescheck and auditing voucher, which are to be marked "approved" by the authorizer. In one of the systems mentioned an apparatus is employed in connection with a telephone system. The salesperson imparts the necessary information through the telephone to the authorizer, who, upon investigating the account and ascertaining that it is in good standing, actuates the apparatus in which the salesperson has inserted the salescheck to stamp or perforate a symbol thereon indicating that the transaction has been approved. If, on the other hand, the customer's account is in such a condition that the customer is not entitled to credit, the authorizer will so inform the salesperson. The latter is then required to request the customer to call at the office regarding his or her account.

The above outlined system has proven unsatisfactory to some extent due to the fact that credit seeking customers usually desire as much privacy as possible relative to the amount of credit they desire. As it is necessary for the salesperson to impart this information over the phone to the authorizer, it can readily be seen that if other patrons are present it causes the customer some annoyance. Also, if the account in question is in an unsatisfactory condition, it frequently results in unpleasant conversation between the authorizer and the salesperson, which conversation may be heard by the customer and others, and it almost invariably results in an unpleasant and embarrassing situation. Further than this, the amount of credit desired is often misstated by unscrupulous salespersons in an effort to increase the amount of their sales. This occasionally occurs in instances where the salesperson is employed on a commission basis; also there is the possibility of the authorizer misunderstanding the amount mentioned by the salesperson. Both of these possibilities afford openings whereby an amount of credit may be authorized which is considerably in excess of the amount to which the customer is entitled.

It often happens through neglect on the part of the salesperson that the auditing voucher is not detached from the salescheck or receipt and retained. As this voucher is, practically speaking, the only record of the transaction that the store has to audit its accounts, it can readily be seen that its loss would not only cause difficulty and inconvenience, but may frequently result in financial loss to the store.

A second system of centralized authorization employed is that which employs a pneumatic tube system in which the salesperson fills out the usual salesreceipt and auditing voucher and dispatches them to the authorizer for approval. If the account is in a satisfactory condition, the authorizer will approve the transaction by initialling the salesreceipt and auditing voucher and return the salescheck to the salesperson. However if the account is in an unsatisfactory condition the authorizer must dispatch a message to the salesperson requesting the customer's presence at the office. In this system considerable time is expended in completing each credit or charge transaction, which not only tries the patience of the customer, but decreases the efficiency of the salesperson and consequently the whole sales system. Therefore it is the object of the present invention to provide a simple and efficient form of apparatus adaptable for use in connection with a centralized authorization system whereby all the short-comings and disadvantages occurring in the systems referred to will be obviated.

The invention contemplates the use of an apparatus in connection with a telephone system, within which apparatus a salesperson may insert the salescheck and auditing voucher, and thereafter visibly indicate to an authorizer at a remote point the amount of credit desired by the customer. Upon ascertaining the condition of the account, the authorizer may actuate the apparatus to visibly indicate to the salesperson that the transaction is approved and simultaneously print the amount of credit authorized on the salescheck and auditing voucher, whereafter the auditing slip is automatically severed from the salescheck and retained within the apparatus, while the salescheck may be removed and delivered to the customer with the merchandise. If the account is not in a satisfactory condition, the authorizer may visibly indicate to the salesperson that the customer's presence is desired at the office, whereupon the salescheck and the auditing slip may be removed from the apparatus and given to the customer that she or he may have the transaction approved at the office.

One form which the invention may assume is exemplified in the following description and illustrated by way of example in the accompanying drawings, in which—

Fig. 1 is a perspective view of one of the sub-station machines.

Fig. 2 is a view of the type of sales-slip employed.

Fig. 3 is a diagrammatic view showing the electrical connections formed between the central station machine and one of the sub-station machines.

Fig. 4 is a similar diagrammatic view showing the electric connections between a central station machine and three sub-station machines.

Fig. 15 is a cross section on line 9—9, Fig. 7, showing the position assumed by the mechanism after second actuation by the authorizer.

Fig. 16 is a section on the same line showing the position assumed by the mechanism after third actuation by the authorizer just before returning to normal position.

The authorizing system disclosed by the present invention embodies a series of sub-station machines, generally indicated at B, and a single central station machine indicated at A. The sub-station machines are identical in construction and may be placed wherever convenient on the sales-counter or otherwise. The sub-station machines are jointly actuated by the salespersons and the authorizer at the central station. The sub-station machines are furthermore jointly connected with the central station machine by telephones and they are otherwise electrically connected with the central station machine to permit certain operations to be performed by the authorizer and the salespersons. The sole duty of the salesperson is to fill out the sale-slips, insert the same in their respective machines and then to depress an operating lever, which actuates a mechanism whereby the amount of credit desired is displayed in the sub-station machine. The sales-person then removes the telephone receiver and thereby closes a signal circuit between the sub-station machine and the central station machine. The authorizer then plugs in, thereby automatically displaying the amount of credit in the central station machine and closing the talking circuit, thus permitting oral transmission of the information required by the authorizer at the central station; the information required being the name and address of the person desiring credit. When this information has been received by the authorizer, the credit account is investigated and if the account is in good standing the sale is authorized. If the account is in any way questionable, the sale is not authorized but a signal is visibly displayed in the sub-station machine which indicates to the salesperson that the sale-slip is to be removed and the person desiring credit is to be directed to the main office, where it will be finally determined whether credit is to be extended or not.

To clearly illustrate the operation of the respective machines, a detailed description of one of the sub-station machines will first be submitted, and secondly a detailed description of the central station machine.

Figure 8:
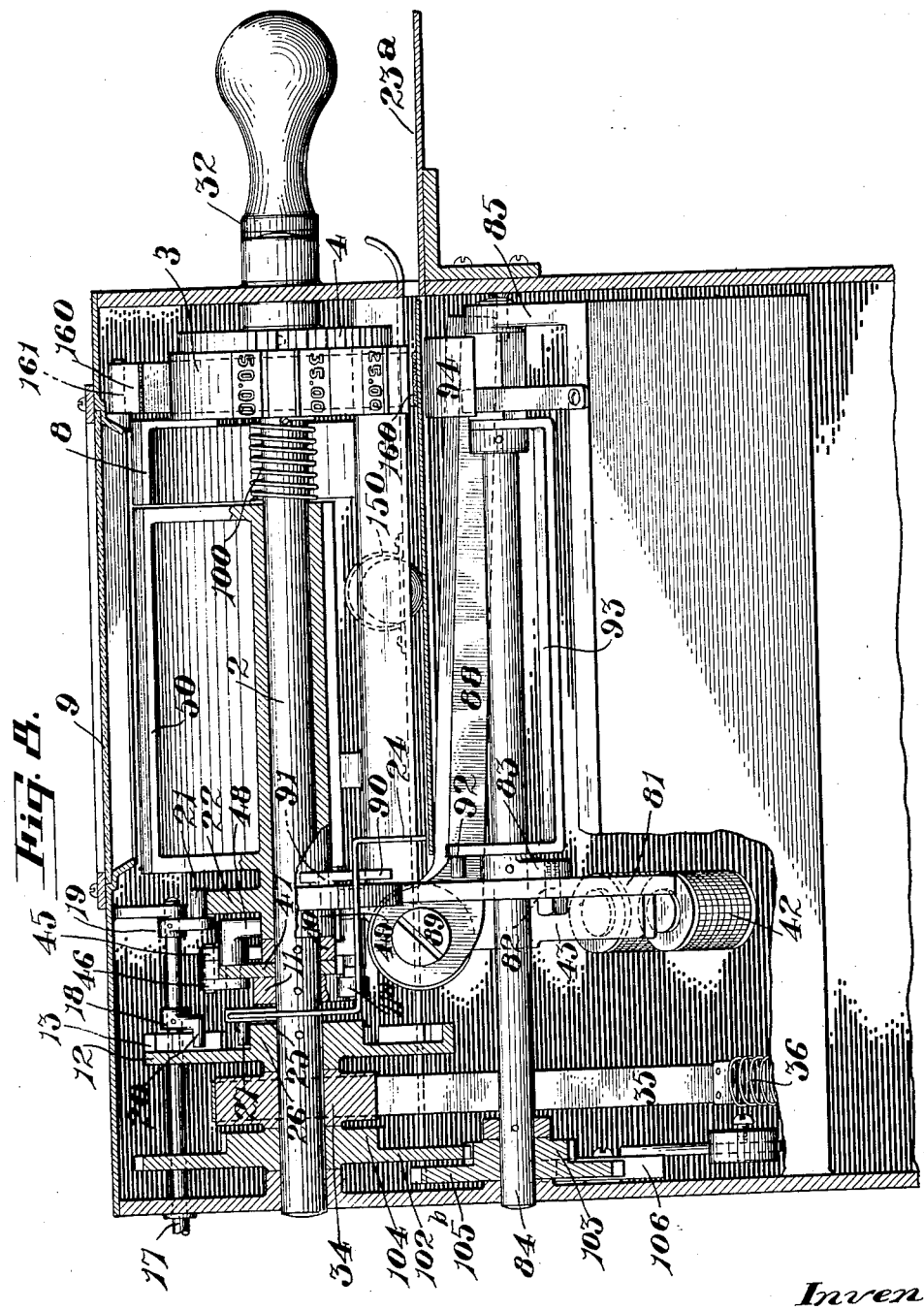
Fig. 8 is a longitudinal section taken on line 8—8, Fig. 9.
Figure 18:
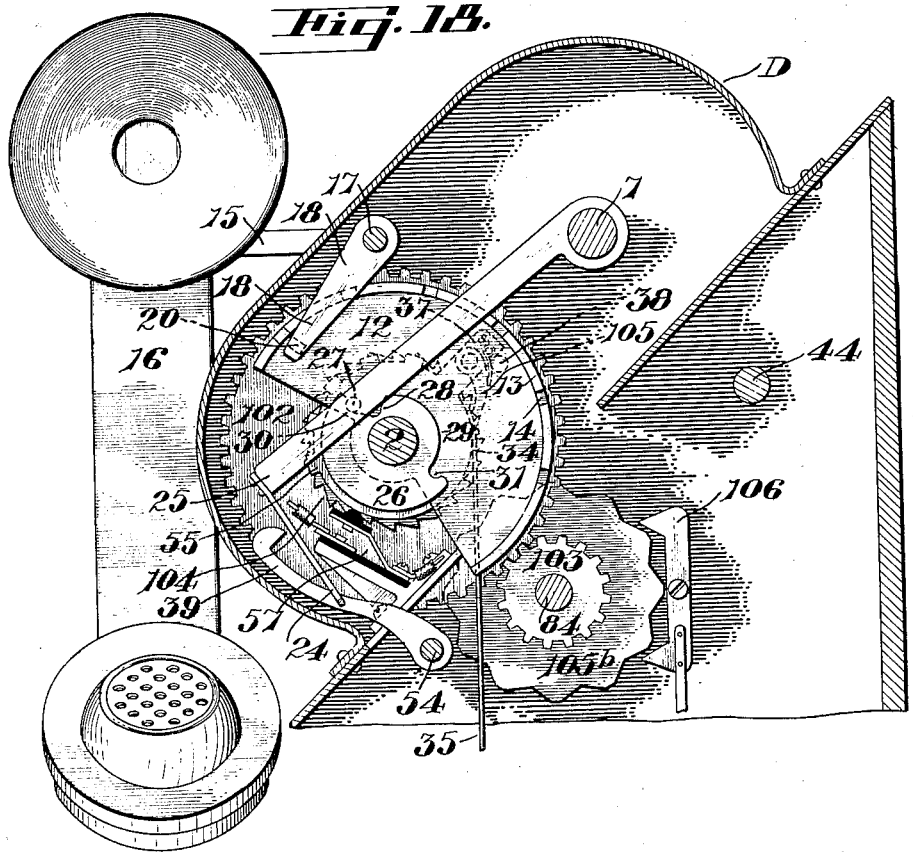
Fig. 18 is a section on line 18—18, Fig. 7.
Figure 19:
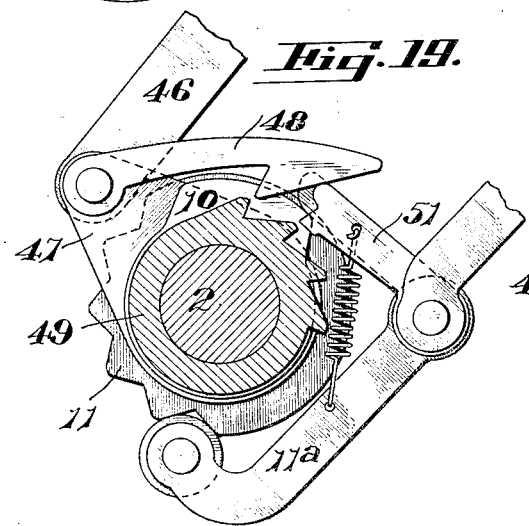
Figs. 19 and 20 are detail views of the drum advancing mechanism.
Figure 20:
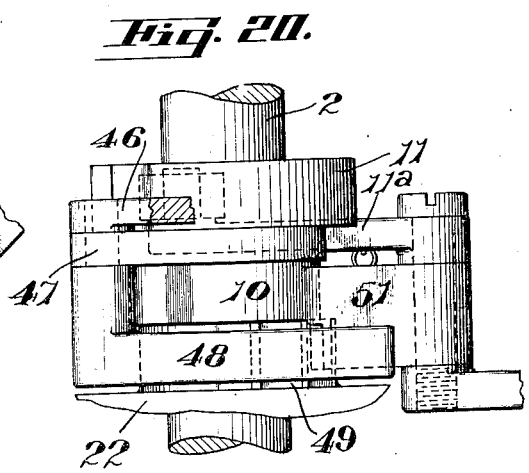

The sub-station machine consists of a main housing B and an auxiliary or superposed housing D, interior of which the major portion of the actuating mechanism is disposed. Extending through the housing D, and journalled therein is a main actuating shaft 2, and secured on one end thereof is a printing wheel 3 (Figs. 8 and 9) and a mutilated spur gear 4, which meshes with an intermediate pinion 5, through which movement is transmitted to a second mutilated gear 6, which is secured on a secondary shaft 7. The gears 4 and 6 are of the same diameter and pitch, and the same ratio of turning movement will therefore be transmitted to the respective shafts. The shaft 7 also carries a printing wheel identical with the one illustrated at 3, which is provided with a series of consecutive numbers. The two printing wheels operate in unison and their function will hereinafter be described. The printing wheel 3 carries a drum 8, which is riveted or otherwise secured thereto, and this drum also carries a series of numbers corresponding to the numbers carried by the printing wheels; the drum carried by the printing wheel and displaying the numbers referred to being placed in alignment with a window or or display opening 9 formed in the top of the casing D. Secured to the opposite end of the shaft 2 is a tripping cam 10 (Figs. 13 and 19), a detent wheel 11, and a drum 12. This drum, as shown in Fig. 18, is provided with an annular inturned flange 13, in which is formed a series of slots or notches 14. The number of notches employed is identical with the number of printing faces formed on the wheels 3 and 6 and the display numbers formed on the drum 8, and are adapted to cooperate therewith as will hereinafter be described. The notched flange 13 is provided for the purpose of rendering the telephone system inoperative, except during predetermined positions of the mechanism, to the extent that it will maintain the telephone receiver hook depressed except when predetermined positions are assumed. This is accomplished in the following manner:

Pivotally mounted on one side of the casing D (Fig. 10) is a hook or arm 15, which is provided for the reception of a combined receiver and transmitter 16 of standard construction. The inner end of the hook 15 is secured on a shaft 17 (Fig. 8), which extends inwardly through the casing D, and this shaft carries two arms as indicated at 18 and 19. The arm 18 has a finger formed on its outer end, as at 20, which is disposed within the rim or flange 13, and as such is held in a depressed position thereby. However when a notch 14 aligns with the pin 20, upward movement of the arms 18 and 19, and consequently turning of shaft 17, will take place providing the receiver 16 is removed, the turning of the shaft 17 being effected by the tension of spring 17ª. The arm 19 is provided with a pin on its outer end, as at 21, and this pin aligns with a cam 22 on which is formed a hook-like projection 23. The cam 22 is secured to the drum 50 and is turnably mounted on shaft 2. This hook engages the pin when the operation of the mechanism is completed and thereby depresses the arm 19, together with the arm 18 and the hook 15, thereby automatically closing the telephone circuit upon completion of the authorizing operation. The cam 22 serves other functions hereinafter to be described.

Figure 10:
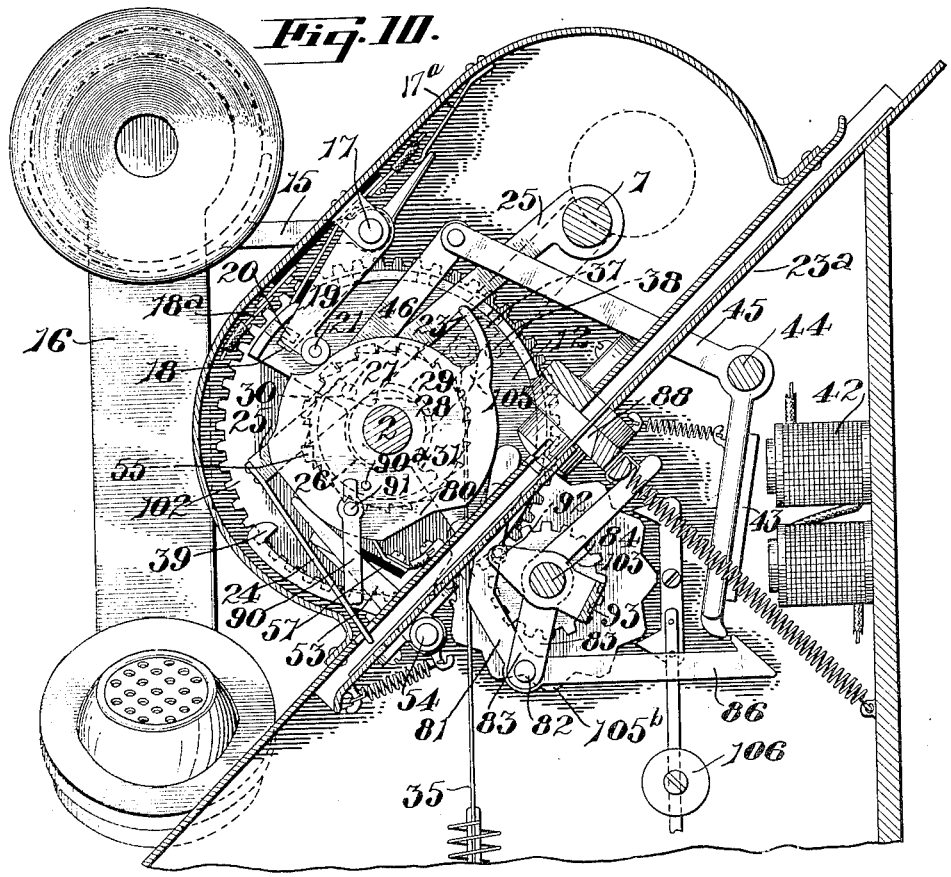
Fig. 10 is a cross section taken on line 10—10, Fig. 7, also showing the mechanism in normal position.

The first operation required on the part of the sales-person, when it is desired to authorize a salescheck, as previously stated, is to place the salescheck in a predetermined position on a receiving shelf indicated at 23ª, the check in proper position being shown in Fig. 10. When inserting the check it is necessary that it be properly positioned and to insure such positioning a pin 24 has been provided. The pin will hereinafter be termed a feeler, and it serves another function which is perhaps of greater importance as it will positively lock the machine against operation if a check is not inserted. The feeler is carried on the outer end of an arm 25, which is turnably mounted on the secondary shaft 7. The arm, together with the feeler, is held in an elevated position with relation to the check receiving shelf 23ª when the mechanism assumes normal position, but the arm will be lowered and the lower end of the feeler will drop through a perforation formed in the check receiving shelf if a check is not inserted or if the check is not properly positioned. This is due to the provision of a locking cam 26 (Fig. 18) which in this instance is formed as an integral part of the drum 12. This cam engages a pin 27 formed on the arm and the formation of the cam is such that the elevated position desired is assumed when the mechanism is in normal position as shown in Fig. 18. This cam is rotated in unison with shaft 2 when the first operation of the mechanism takes place and the formation of the cam is such that the arm 25 will be slightly lowered until the end of the feeler engages the inserted check. Further downward movement of the arm 25 and the feeler will be prevented if the check is inserted and in proper position, and continued movement of cam 26 will be permitted as pin 27 will not drop behind shoulder 28. However if the check is not inserted or not properly positioned, the lower end of the feeler will pass through the perforation formed in the receiving shelf, and the movement of the cam 26 will be stopped as the shoulder 28 will then engage the pin and stop further operation of the mechanism. On the other hand if the check is inserted and properly positioned, pin 27 will be held at such an elevation that the shoulder will clear the same and pin 27 will ride on the concentric surface of the cam indicated at 29, and thus permit further rotation. The cam 26 also serves another function, to-wit, that of limiting the rotation of shaft 2 to one-half revolution, that is a hook 30 on one side of the cam stops turning movement in one direction, and a similar hook 31 on the opposite side limits the movement in the opposite direction, the pin 27 serving as a stop in either instance. The shaft 2 is rotated manually by means of a hand crank 32 secured thereon and disposed on one side of the casing as shown in Fig. 1.

The first duty of the operator, as already stated, is that of inserting the salescheck and properly positioning the same. The second operation required is that of imparting a one-half revolution to the shaft 2; this being accomplished manually by the salesperson who grasps the crank 32 and imparts this movement. During this second operation on the part of the salesperson, the printing wheels 3 and 6, the tripping cam, the detent wheel 11, the drum 12 and the stop cam 26, are also rotated as they are fixed to the shaft. This one-half revolution of the shaft 2 and the parts attached thereto is also transmitted to rotate a loosely mounted resetting drum 34 supported on shaft 2. This resetting drum has a flexible tape attached thereto, as indicated at 35, and the opposite end of this tape is connected with a helically wound tension spring 36, which is placed under tension and exerts a pull on the tape when it is partially wound about the resetting drum. The resetting drum is employed for the purpose of returning the shaft 2 and the several parts attached thereto to normal position upon completion of the authorizing operation, and the manner in which this is accomplished will hereinafter be described.

The resetting drum is provided with an extending arm, as indicated at 37, which is engaged by a pin 38 secured on the side of the drum 12. This pin 38 engages the arm 37 during the initial one-half rotation of shaft 2, and therefore transmits a turning movement to the resetting drum which is freely journaled on the shaft. The resetting drum is temporarily locked against retrograde or reverse movement when a one-half revolution has been imparted thereto by means of a pawl 39 which engages the outer end of the arm upon completion of the one-half revolution. This pawl is however automatically released by a mechanism actuated by the authorizer, hereinafter to be described and thereby permits a partial retrograde movement of the resetting drum 34.

Figure 12:
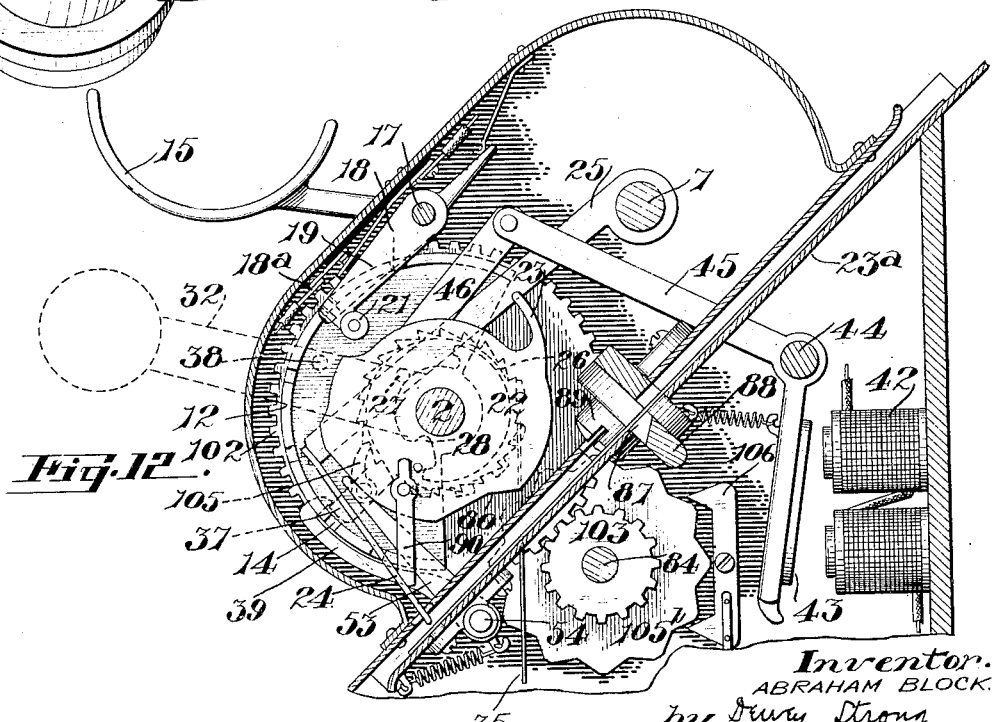
Fig. 12 is a section on the same line showing the position of the mechanism after completion of the second operation.
Figure 13:
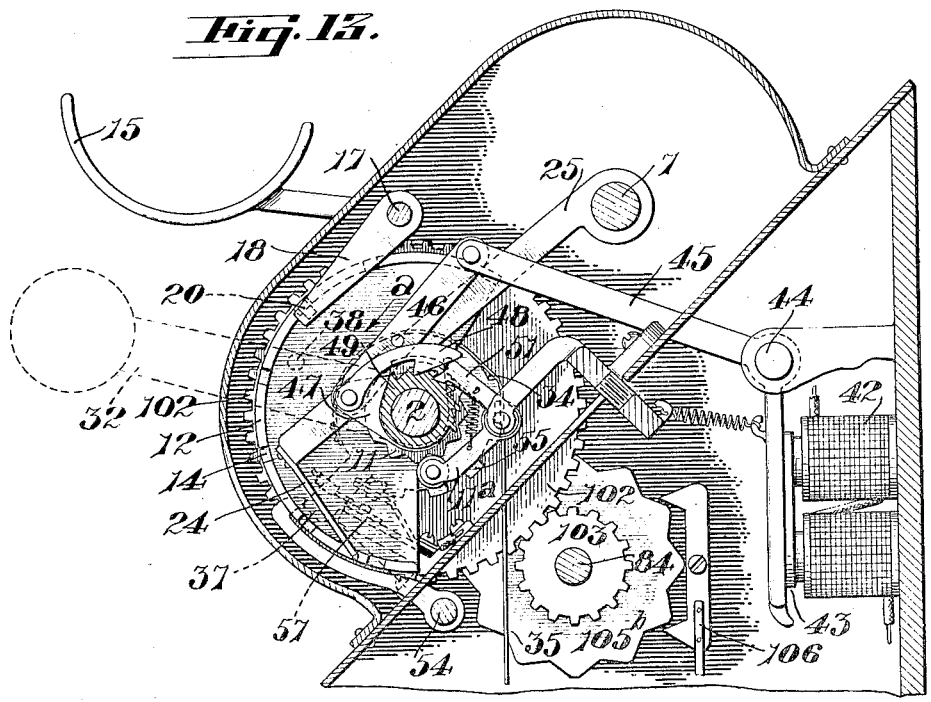
Fig. 13 is a cross section taken on line 13—13, Fig. 7, showing the position of the mechanism after first actuation by the authorizer.

The third operation required on the part of the salesperson is that of reversing the movement of the shaft 2 until the amount to be authorized registers with the window 9, that is the drum 8 previously described displays numbers indicating various sums, for instance such sums as $10.00, $15.00, $20.00, $35.00 and $50.00, and shaft 2 is therefore reversed until the required number registers with the display window. In this instance we will suppose that the amount to be authorized is $15.00. The salesperson will therefore reverse shaft 2 until the numeral 15 registers with the window 9; perfect registration being obtained by the detent wheel 11 secured on shaft 2 and a spring actuated arm 11ª carrying a roller. The hand crank will now be released by the salesperson and the receiver will be removed from the hook 15. Removal of the receiver and closing of the telephone circuit by means of the hook 15 will at this time be permitted as one of the notches 14 in the drum 12 will be in perfect register with the pin 20 of arm 18, the detent wheel 11 insuring such registration. The moment the hook 15 rises, the telephone circuit is closed by means of arm 18, which engages a contact switch 18ª, (see Fig. 12). The closing of this switch completes the telephone circuit and the usual light will be displayed on the switch board as indicated at 40 in the central station or in the authorizing office. The authorizer upon observing the light immediately removes a similar receiver and at the same time plugs in the circuit by a suitable jack or plug as indicated at 41 (Fig. 3), thus being able to communicate with the salesperson. The plug 41 simultaneously closes a circuit through a magnet 42 in the sub-station machine, thereby energizing the same and actuating an armature 43. This armature is pivotally mounted on a shaft 44 and has an angular extension 45. The free end of the extension 45 carries a link 46, which connects the lever 45 with a crank arm 47 journaled on the shaft 2. Also carried by the crank arm 47 is a pawl 48, as shown in Fig. 13. Upon energization of the magnet 42, the link 46 will be moved in the direction of the arrow a causing swinging movement of the crank arm 47, and consequently the pawl 48, the latter engaging a ratchet wheel 49. The ratchet wheel 49 in the present instance is formed as an integral part of the cam 22 and consequently they will move in unison. Also connected with the cam 22 is a segmental drum 50, which is also turnably mounted on the shaft 2. (See Figs. 8 and 13.) This drum bears such legends as are necessary to convey certain information to the salesperson. These legends are, to-wit: "Insert check"; "Operator", "Customer to office", and "Authorized." These legends may be successively displayed by the authorizer as will be described.

Figure 14:
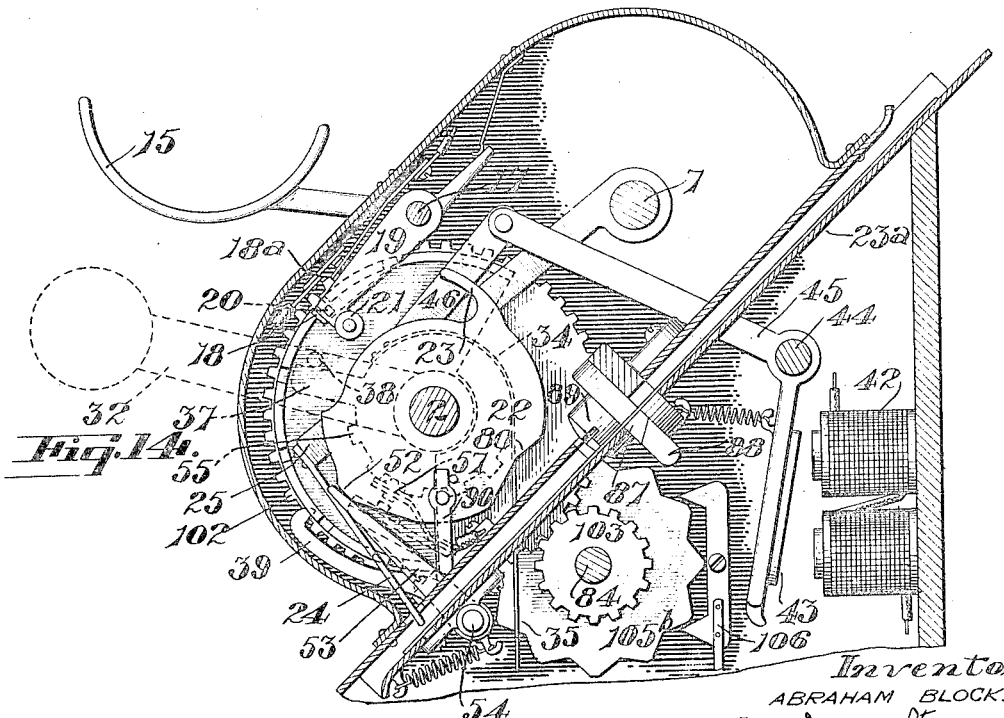
Fig. 14 is a section on line 10—10, Fig. 7, showing the final position assumed by the mechanism after first actuation by the authorizer.

When the authorizer closes the telephone circuit between the machines, the magnets 42 are energized as described and movement of the pawl 48 causes rotation of the ratchet wheel 49, the cam 22 and the drum 50. This advances these three elements one step, where they are held by a pawl 51 engaging the ratchet wheel 49, as shown in Fig. 13. This advance of the drum displays in the window 9 the legend "Operator", which indicates to the salesperson that the authorizer is ready to receive the information regarding the transaction. This eliminates the necessity of oral conversation between the salesperson and authorizer other than imparting the name and address of the patron by the salesperson. This is done immediately when the legend "Operator" appears in the window 9. Upon receiving the name and address of the patron, the authorizer may then refer to the account ledger, or to an index synopsis thereof, to ascertain the condition of the account. The energization of the magnets 42 and turning movement of the ratchet 49 and cam 22 causes automatic release of a mechanism in the sub-station machine which in turn actuates a mechanism in the central station machine which visibly displays on the authorizing machine at the central office the amount of credit to be authorized. This is accomplished in the following manner:

As the cam 22 advances one step a rise 52 thereon engages a lever 53 which is secured on a shaft 54. As the latch member 39 is also secured on the shaft 54, the lever 53 and the latch will move in unison and therefore when the rise 52 of the cam 22 engages the lever 53, the latch 39 will be swung outwardly to release the arm 37 of the drum 34. The drum 34 will then rotate, due to the action of the spring 36, until the arm 37 on the drum engages the pin 38 on the drum 12, thus temporarily stopping retrograde movement thereof. Formed on a portion of the periphery of the drum is a series of interspaced projections as shown at 55, in Fig. 14. This drum is also illustrated in the diagrammatic view Fig. 3, and serves the function of making and breaking a circuit through an actuating magnet 56 mounted in the authorizing machine, that is a switch member 57 is disposed adjacent or in alignment with the resetting drum 34, on that side thereof which is provided with the projections 55. These projections engage the switch and thereby alternately open and close the same until the arm 37 is stopped by the pin 38, the position of which is determined by the amount to be authorized and the setting of the drum 12. The circuit through the magnet 56, which is disposed within the machine in the central station (see Figs. 5 and 6), is thus opened and closed a predetermined number of times and an armature 58 actuated thereby is thus raised and lowered a similar number of times. The armature is pivotally mounted, as at 59, and is provided with an extending arm 60 which is connected to a crank arm 61 by means of a link 62. This crank arm is turnably mounted on a shaft 63, (see Fig. 5) which is journaled within the casing of the central station machine. The crank arm carries a pawl 64, the free end of which normally engages a ratchet wheel 65 secured on the shaft. The ratchet wheel is also engaged by a pawl 66 pivotally disposed within the casing, as at 67, and this pawl temporarily stops retrograde movement of the shaft 63 during the intermittent operation of the magnet 56. The shaft 63 carries a wheel or drum 68, which is secured thereto. This wheel displays a series of numbers identical with the numbers formed on the printing faces of the printing wheels 3 and 6, and as a step by step rotary movement is transmitted to shaft 63 and the drum 68 carried thereby consecutive numbers successively align with the display opening or window 70 formed in the casing. It was previously stated, for purposes of illustration, that the amount to be authorized was $15.00, and as the number 15 is formed on the second printing face of the printing wheels and assumes the second position on the drum 68, it can be seen that it will only be necessary to advance the drum 68 two steps. In other words the position of drum 12 and the pin 38 carried thereby will be such that the retrograde movement of the resetting drum 34 will be such that only two of the projections 55 formed thereon will pass the switch 50, and close the circuit twice through the magnet 56, hence a two step advance is imparted to drum 68 and the numeral 15 will appear in the window 70 of the central station machine. If the customer's account is in good standing the authorizer will immediately proceed to authorize the salescheck previously placed in the sub-station machine. However it may happen that the account is questionable and the authorizer will therefore proceed with one of two operations, that is, either the sub-station machine will be actuated to display the legend "Customer to office", in which instance the salescheck will be removed and the customer accordingly instructed; or the salescheck will be authorized.

For purposes of illustration we will assume that the account is questionable and that the salesperson is to be so instructed. In that instance the operation will be as follows:

Pivotally mounted on the central station machine, as at 71, is an operating switch lever 72. Formed on the lower end of this lever is a pin 73 which is adapted to engage a pivotally mounted lever 74. (See Fig. 5.) This lever actuates two distinct members, to-wit, a switch 75 and the pawl 66 previously described. The switch 75 is disposed in the circuit of the magnet 42 and will accordingly make and break the circuit through said magnet. This magnet as previously described serves the function of imparting a step by step rotation through means of the pawl 48 to the cam 22 and the drum 50. If the account is questionable, the switch operating lever 72 is moved over to the dotted line position shown at 72ª and returned. This movement imparts a rocking movement to the arm 74 and thereby breaks and makes a circuit through the magnet 42. The magnet thus energized actuates the arm 45, link 46, crank arm 47 and pawl 48, and as this engages the ratchet wheel 49, a second step or partial rotation of movement will be imparted to the cam 22 and the drum 50. The second legend, to-wit, "Customer to office", will thus be brought into register with the display window 9 and accordingly instructs the salesperson. The salesperson will in that instance remove the sale-slip and request the customer to call at the main credit office where the transaction will be finally determined.

We may now consider the final operation of the machine, to-wit that of authorizing the sale-slip and we will therefore suppose that the account under consideration is in good standing. If that is the case switch lever 72 will again be moved to the dotted line position and returned, and the armature cooperating with the magnet 42 will therefore receive a second impulse and actuate the connected mechanism. Cam 22 and drum 50 will thus advance a third step and the legend "Authorized" will appear in the display window 9. If the check is to be authorized the consecutive operations of the switch levers 72 are so rapid that the legend, "Customer to office" will only momentarily appear as, practically speaking, it merely passes the display window; therefore when a check is to be authorized even though "Customer to office" appears before "Authorized", the time interval is so short that the salesperson will not have an opportunity to remove the check. When the final impulse has been imparted to the magnet 42 during the authorizing operation, the following operations will take place:

During the second advance movement imparted to the cam 22 and the drum 50, a recess 80 formed in the face of the cam 22, (see Figs. 14 and 15) aligns with the end of a lever 81, which is pivotally supported, as at 82, on a swinging lever 83, which in turn is pivotally supported, as at 84, by a bracket 85. Formed as an extension on the lever 81 is a latch member 86, the inner end of which aligns with the armature 43. Due to the aligning of the recess 80 with the end of the lever 81, armature 43 is engaged by the latch 86, the armature being in de-energized position when the latching engagement is made. During the final or last advance movement of the cam 22 and drum 50, which takes place when the check is authorized, magnet 42 is again energized and the armature 43 attracted. This movement of the armature is imparted to rock the lever 83 and this movement in turn is transmitted to sever the salescheck; this being accomplished in the following manner:

Formed in the face of the check receiving shelf, at the point indicated at 87, is a longitudinally disposed transverse slot, and disposed directly below the same is a knife 88. This knife is pivotally supported at one end, as at 89 (see Fig. 8), and is engaged by the lever 83 and upward movement is thus imparted to the knife, which shears or severs the check. Simultaneous with the actuation of the lever 83, and during the last advance movement imparted to the cam 22, a finger 90 attached to one side of the cam, as at 91, engages a pin 92 disposed on one side of the printing platen support 93. There are two platen members employed as indicated at 94 and 95, one for each printing wheel as at 3 and 6. These platens are carried by crank-like arms 93ª and 93ᵇ, respectively, which are pivotally supported on shafts 44 and 84ª. The lower ends of the arms 93ª and 93ᵇ are connected by a link 96, and as arm 90 swings in unison with cam 22, engagement will be made with the pin 92 and a rocking movement will accordingly be imparted to the arms 93ᵃ and 93ᵇ in unison until finger 90 reaches a point where it passes or clears the pin 92. It might here be stated that the finger 90 is pivotally attached to the side of the cam and that its movement in one direction is limited by a pin 90ᵃ. It is however free to swing in the opposite direction and in fact must be free to swing as it will again pass the pin 92 when the printing operation has been completed.

It has been previously stated in the specification that cam 22 is provided with a hook-like projection as indicated at 23. This hook will during the last advance movement of the cam engage the pin 21 on the end of lever 19 and will thus reverse the movement of shaft 17 which carries the receiver hook and the arm 18. Arm 18 serves the function of locking the drum 12 against rotation, this lock being formed by alignment of pin 20 with one of the notches formed therein. Therefore as the hook 23 engages the pin 21 and rocks arm 19 engagement of pin 20 with the notch in the drum 13 will be broken and the drum, together with shaft 2, and the several parts attached thereto, will then be free to return to normal position. Previous to this release the salescheck has been severed, the printing platens have been swung to printing position and the printing operation and return of all mechanism to normal position will instantly take place the moment drum 12 is released; movement to turn the drum, the shaft 2 and all the parts carried thereby being imparted thereto by means of spring 36, the flexible tape 35 and the resetting drum 34, that is the arm 37 formed on the drum, which is already in engagement with the pin 38 secured on the drum, will in that instance exert such a pressure as to turn the drum, the shaft and all the parts carried thereby. The printing wheel 3 being secured to the shaft will also turn and this turning movement will be imparted to the second printing wheel 6 through the intermeshing gears. The printing faces carrying the amount of $15.00 are in direct alignment with the platens when the return movement starts and will during this rotation engage the platens and return these to normal position; sufficient pressure being brought to bear upon the check during this movement to impart the printing in the place indicated at 98 and 99 on the respective portions of the check as shown in Fig. 2. A slight forward movement is simultaneously imparted to the respective sections of the check, which has previously been severed, and the lowermost section thereof will thereby be deposited in a receptacle formed in the lower portion of the casing from where it can only be removed by the proper authorities as this compartment is locked. The upper portion of the check is however prevented from entering this compartment as it is frictionally held on the upper portion of the receiving shelf by a ball or weight 150 (see Fig. 9), and it may therefore be removed by the salesperson. If the goods purchased are to be delivered, the check is accordingly marked and pasted on the package, but if the goods are immediately delivered to the customer it may be handed to the customer as a receipt for the purchase.

Figure 7:
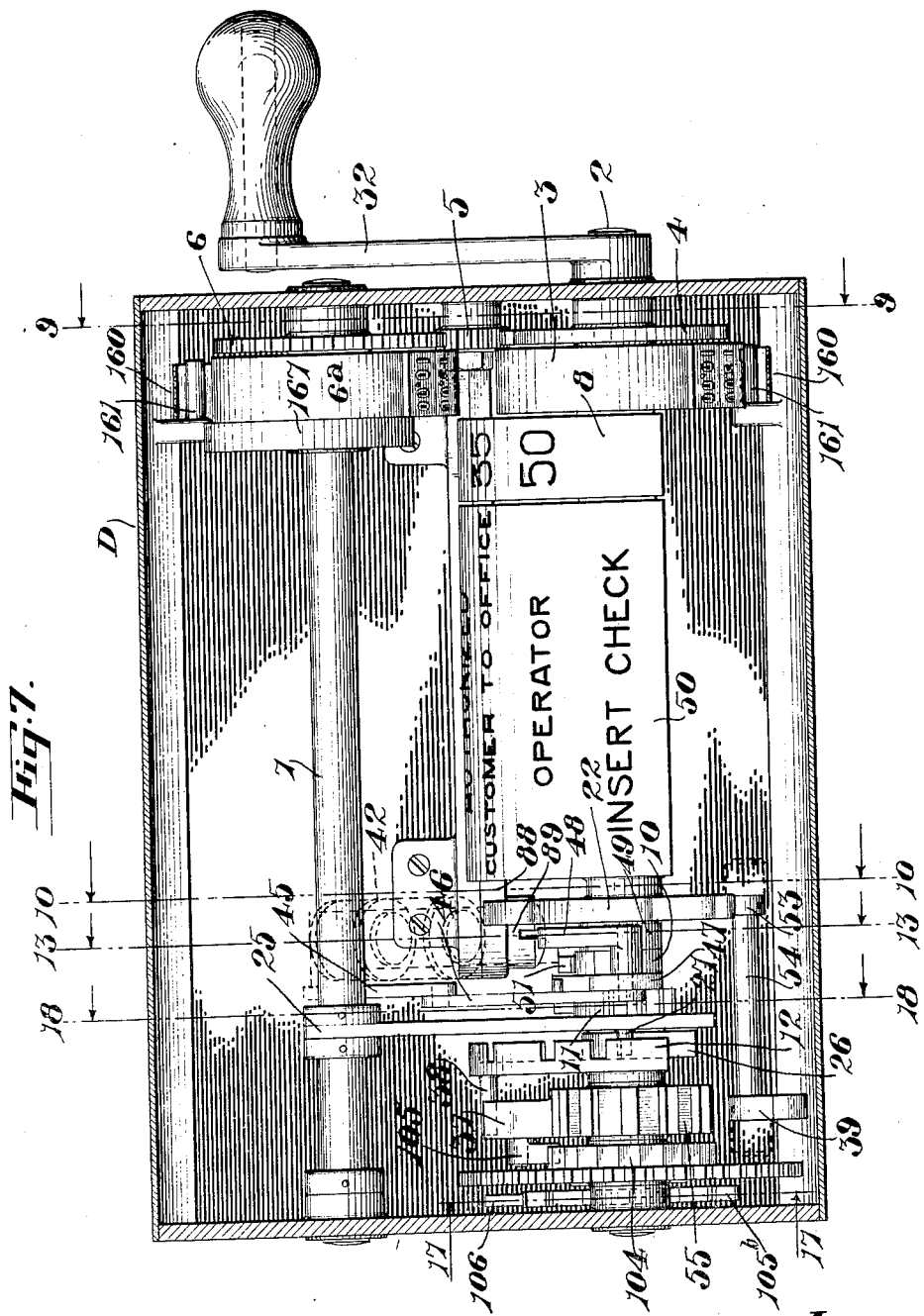
Fig. 7 is a plan view of the mechanism contained within the auxiliary casing of one of the sub-station machines.
Figure 9:
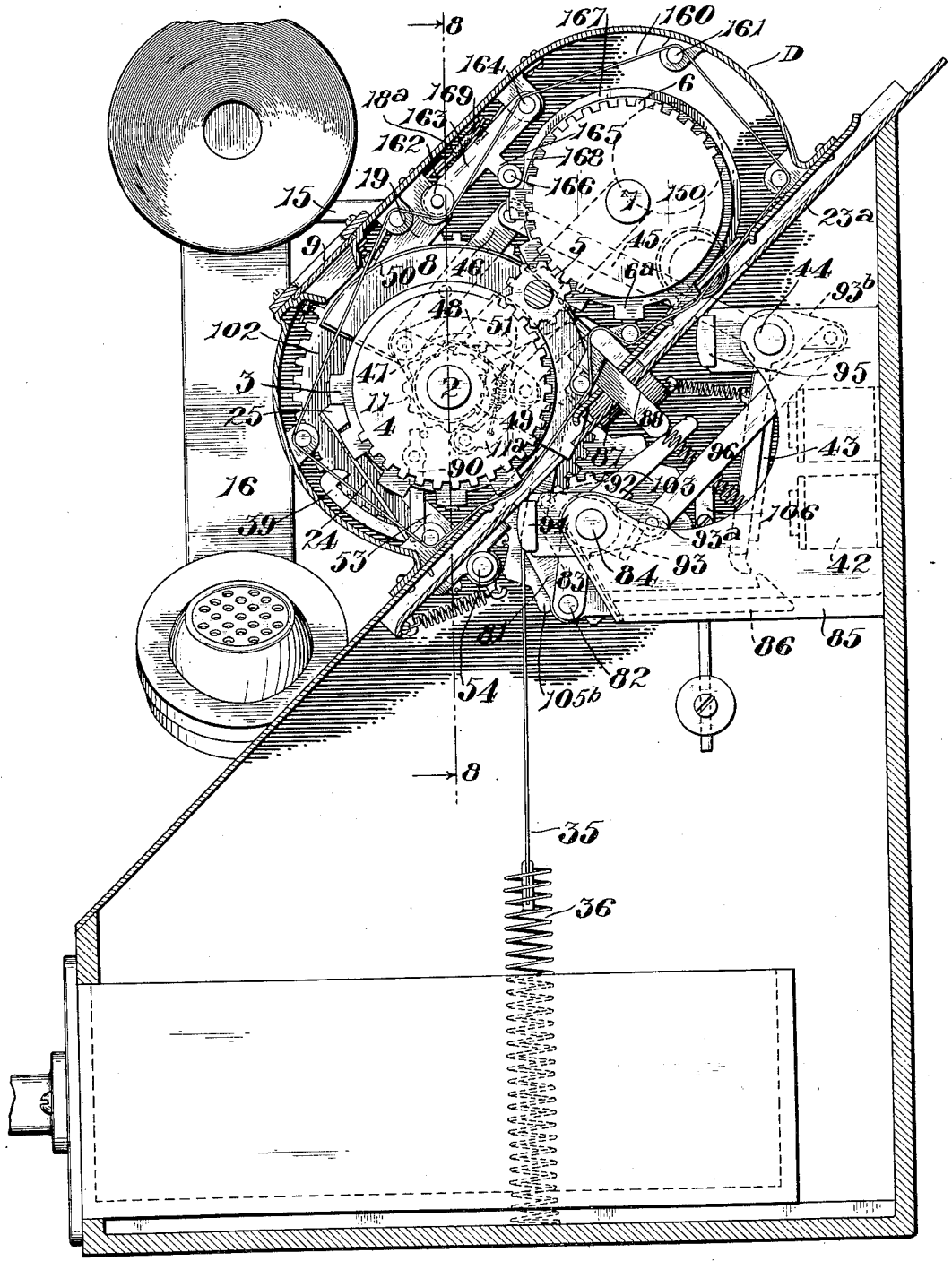
Fig. 9 is a cross section taken on line 9—9, Fig. 7, showing the mechanism in normal or rest position.

For the purpose of supplying ink to the printing faces, an endless ribbon 160 is employed. This ribbon and the mechanism actuating the same are best illustrated in Figs. 7 and 9. The ribbon is supported by rollers 161 secured in the casing D and it passes over these rollers and between the platens and the printing faces. The ribbon is automatically advanced frictionally when the printing platens and the cooperating faces move in unison and the ribbon is maintained in a slack condition during this movement. It is otherwise retained in a taut condition by means of a tension roller 162. This roller is secured on the outer end of an arm 163, pivotally secured to the casing D, as at 164. Formed as an extension on the arm 163 is an arm 165, and journaled thereon is a roller 166, which aligns with a cam 167 secured on the shaft 7. A notch is formed in the cam 167, as at 168, and the roller 166 aligns with this notch when the mechanism assumes rest or inoperative position. Arm 163 is engaged by a spring 169 and pressure is thus applied to force the roller 162 downwardly against the ribbon to maintain it in a taut condition during the rest position. During operation of the mechanism, cam 167 rotates with shaft 7 and the face of the cam will then engage the roller 168 and raise the arm 163, together with the roller 162 away from the ribbon, thus leaving the ribbon in a slack condition so that it may be frictionally advanced by the printing faces and the cooperating platens during their printing operation. A step by step movement will thus be imparted to the ribbon during each operation of the mechanism and no portion thereof will be subjected to excess use or wear.

When the shaft 2 and the several parts attached thereto are returned to normal position, it is only necessary that cam 22, together with drum 50, be returned to normal position. The retrograde movement of these parts is imparted by a spring 100, which is coiled about the shaft 2 and attached at one end to the shaft and at the opposite end to the drum 50. The cam 22 and drum 50 are normally locked against retrograde movement on shaft 2 by means of the pawl 51, which engages the ratchet wheel 49. However the width of the pawl 51 or face presented thereby is such that it is engaged by the cam 10 during the return movement thereof and the pawl is thus lifted out of engagement with the ratchet wheel 49, thus releasing the cam 22 and the drum and permitting the spring 100 to return these to normal position, and when so returned the legend "Insert check" will appear showing that the sub-station machine is in readiness for another operation. This legend is of further importance as it serves as a constant reminder or instruction to the salesperson that the salescheck must be inserted before the machine can be operated. All the parts of the mechanism are returned to normal position if a check is authorized by the action of the hook 23 and the cam 22. This may be termed the automatic release as the engagement of the hook with the pin 21 causes depression of the receiver hook and release of pin 20 with relation to the notches in the drum 12; this release being necessary to permit automatic return of the several parts of the mechanism. A similar release may be accomplished manually on the part of the salesperson and such release is necessary if the check is not authorized, that is if the authorizer in the central station actuates the sub-station machine to display "Customer to office", the salesperson will immediately remove the check and will then return the receiver to the hook. This return of the receiver releases the drum 12 as it depresses the hook and thereby turns shaft 17 and the arms 18 and 19, thus disengaging the pin 20 with relation to the drum 12 and thereby permitting automatic return as previously described.

Figure 17:
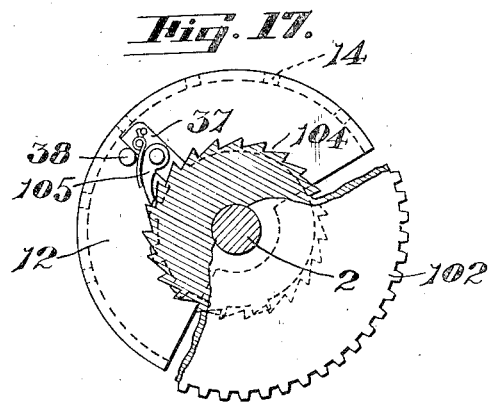
Fig. 17 is a section taken on line 17—17, Fig. 7, said view being partially in elevation and partially broken away.
Figure 11:
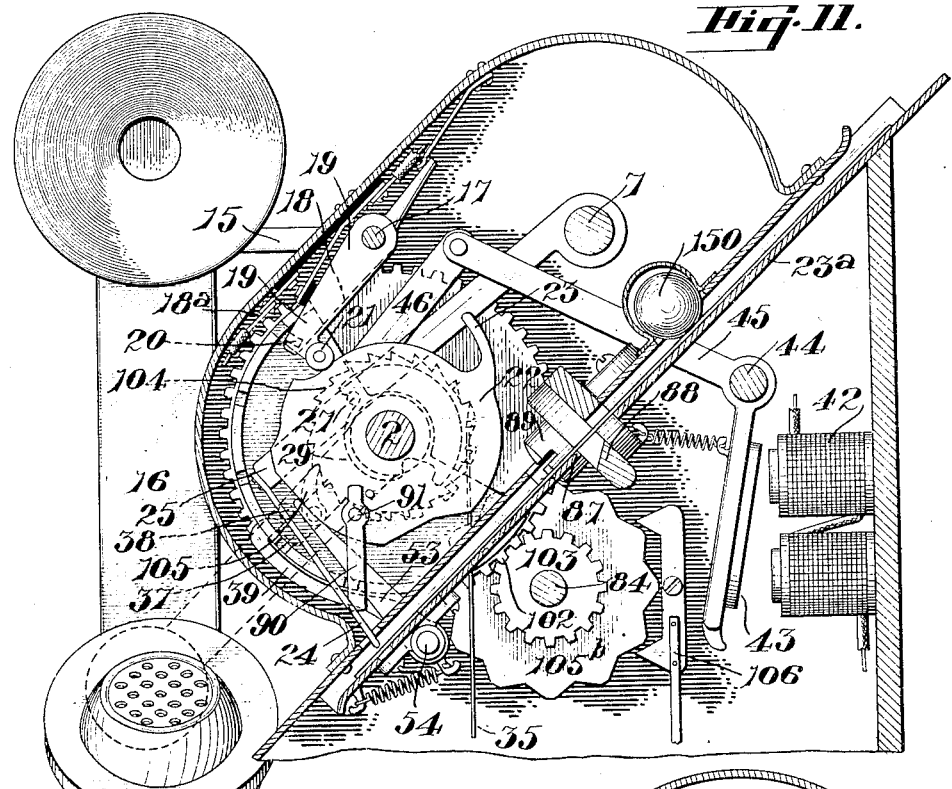
Fig. 11 is a cross section on line 10—10, Fig. 7, showing the position of the mechanism after the completion of the first operation.

By referring to Figs. 8, 13, 14 and 18 of the drawings it can readily be seen that the return of the shaft 2 and the several parts attached thereto would be almost instantaneous when the printing or authorizing operation took place. Such instantaneous movement would not be desirable and for this reason a speed controlling or retarding mechanism is employed in conjunction with the resetting drum 34. This retarding or speed controlling mechanism consists of a series of gears such as indicated at 102 and 103. The gear 102 is freely turnable on shaft 2, while the gear 103 is freely turnable on the shaft 84. Formed on the inner face of the gear 102 is a ratchet wheel 104 and engageable therewith is a pawl 105, which is carried by the arm 37. This pawl rides freely over the ratchet wheel 104 when the resetting drum is turned in one direction, but will engage the ratchet wheel and impart rotary movement to the gears 102 and 103 during retrograde movement of the resetting drum and the shaft 2, as shown in Fig. 17. The retrograde movement imparted, so far as the resetting drum 34 is concerned, takes place during different operations of the mechanism. The first retrograde movement of the resetting drum takes place when magnet 42 is first energized by the authorizer in the central station and it is during this retrograde movement that the projections 55 actuate the switch 56 and thereby advance the number displaying wheel 68 in the central station machine. This first retrograde movement is retarded or regulated as is also the final retrograde movement which takes place during the authorizing operation when the mechanism is returned to normal position. The gear 103 carries an escapement wheel $105^b$, which is engaged by a weighted escapement lever 106. This escapement mechanism retards the rotation of the gears 102 and 103, and as the pawl carried by the resetting drum is in engagement with the ratchet wheel 104, return movement of the resetting drum and the remaining mechanism carried by shaft 2 is similarly retarded or regulated.

Figure 5:
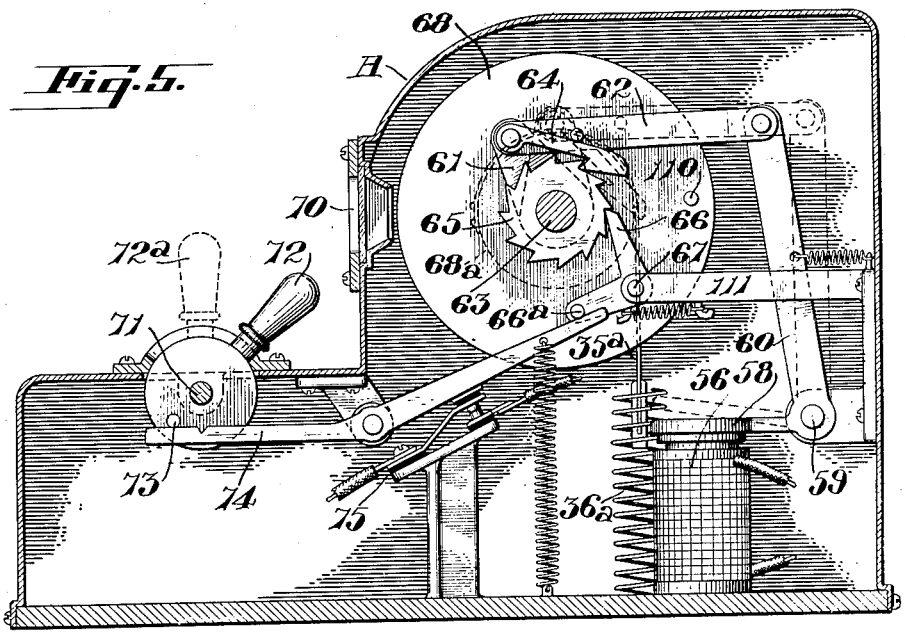
Fig. 5 is a central, vertical, longitudinal section on line 5—5, Fig. 6.
Figure 6:
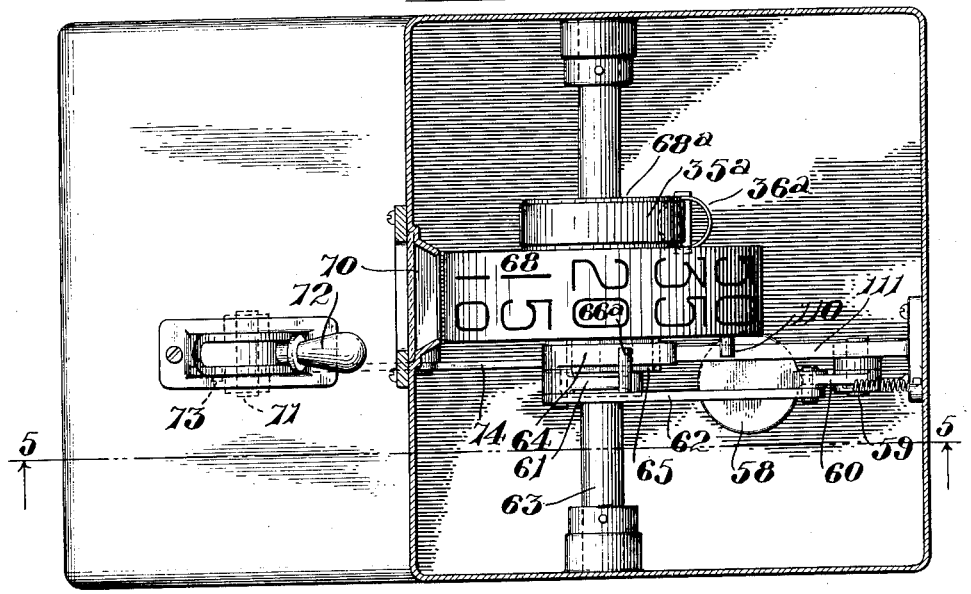
Fig. 6 is a plan view of the central station machine showing the top cover removed.

The mechanism which is disposed in the central station machine, illustrated in Figs. 5 and 6, is also automatically released and returned to a normal position when the authorizing operation has been completed; that is the number wheel 68 journaled in the machine has a drum formed on one side thereof as indicated at $68^a$. This drum has a flexible tape attached thereto, as at $35^a$, and this tape is in turn secured to a helical tension spring $36^a$ similar to that indicated at 36. The shaft 63 upon which the number displaying wheel is secured is rotated step by step by means of the magnet 56 and the mechanism actuated thereby, to-wit, arm 60, link 62, crank arm 61 and pawl 64, and retrograde movement is prevented as the spring $36^a$ is placed under tension by means of the pawl 66. This pawl must therefore be released when the several parts are to be returned to normal position after completion of the authorizing operation and this is accomplished by means of the lever 74. This lever engages a pin $66^a$ formed on the lower end of the pawl 66 and thereby raises the pawl out of engagement with the ratchet wheel 63. The upper end of the pawl simultaneously engages the pawl 64 as this will assume the dotted line position shown when the magnet is energized. Both pawls are therefore simultaneously thrown out of engagement and the pull exerted by the spring $36^a$ will through the flexible tape $35^a$ return the number displaying wheel to normal position, a predetermined normal position being maintained by a pin 110 and a stop arm 111.

In the present instance we have merely described a single authorizing machine and a single central station machine. It should however be obvious that a considerable number of sub-station machines are employed in actual practice but usually only one central station machine. It is therefore necessary to provide an electric wiring system whereby several sub-station machines can be actuated from the central station machine optionally and whereby communication may be established between the several sub-station machines and the central station machine, such a wiring arrangement being illustrated in Fig. 4. In this diagram a single central station machine is diagrammatically indicated at 105ª, and three sub-station machines, as at 106ª, 107, and 108. In such an installation it is of course necessary that a signal light be employed in connection with each sub-station, and similarly separate plugging in switches as indicated at 109, 110 and 111; the several circuits being otherwise identical with that illustrated in Fig. 3. By referring to Fig. 3, a detailed description of the several circuits established and the general operation of the machine will be given.

As previously stated when a purchase is made and a certain amount is to be authorized the salesperson will grasp the crank of the machine and impart a one-half revolution to the shaft 2. The movement of the crank and the shaft will then be reversed until the wheel or drum carrying the numbers, which register with the window, displays the amount desired. The salesperson then removes the receiver from the hook 15 and a circuit will thus be established through the switch 18ª and the signal light 40 in the authorizer's office. This circuit can be traced as follows:

Commencing with the battery F, the current passes through a wire 200, the signal light 40, wire 40ª, contacts 201 and 202, wire 203, then through the receiver and transmitter of the sub-station, hook 15, switch 18ª, wire 204, contacts 205 and 206, and wire 207, which completes the circuit. The authorizer in the main office is notified the moment this circuit is closed by the lighting of the signal light 40 and he or she will then insert the plug 41 and will simultaneously remove the receiver, indicated at 208.

Four different operations take place when the plug 41 is inserted: First, the circuit through the signal light is broken as the contacts 201, 202, 205 and 206 are separated. Secondly, a talking circuit is established through battery E, and the respective transmitters and receivers. This circuit can be traced as follows:

Commencing with battery E, the current passes through wire 209, receiver 208, wire 210, plug 41, contact 202, wire 203, the receiver at the sub-station indicated at 211, the transmitter 212 connected therewith, wire 213, hook 15, switch 18ª, wire 204, contact 205, plug 41, wire 214, transmitter 215 of the authorizing station, and wire 216, which is connected with the opposite terminal of battery E, thus completing the talking circuit.

Thirdly, a circuit is completed through the magnets 42 and this circuit can be traced as follows:

Commencing with battery F, the current passes through wire 207, wire 217, switch 75, wire 218, plug 41, contact 219, wire 220, magnets 42, and wire 221, which is connected with the opposite terminal of battery F, thus completing this circuit. Energization of magnet 42 actuates the mechanism which advances the legend carrying drum one step and the word "Operator" is thus displayed in the sub-station machine B, thus indicating to the salesperson at the sub-station that the authorizer is on the line and is therefore ready to receive the name and address of the customer asking credit.

The fourth operation taking place is the release of the drum 34 and the operation of switch 57, whereby magnet 56 in the authorizing station is actuated. The release of the drum 34 is simultaneous with the energization of the magnet 42, and such release permits the drum 34 to partially rotate. The cam members 55 on the drum will during this partial rotation open and close the switch 57 and the circuit established by this circuit can be traced as follows:

Commencing with battery F, the current passes through wire 207, wire 224, magnet 56, wire 225, plug 41, contact 202, wire 203, wire 226, switch 57, wire 227, and wire 221 which connects with the opposite terminal of the battery. This circuit is, as previously stated, opened and closed a predetermined number of times by the cam-like projections 55 which actuate the switch 57 and a series of impulses are thus passed through the magnet 56. This magnet advances the accumulating or number displaying wheel in the authorizing machine and the amount to be authorized is thus displayed in said machine, thereby displaying to the authorizer the amount which it is desired to authorize, and it therefore eliminates the necessity of further oral conversation over the talking circuit, except that of transmitting the name and address of the person desiring credit.

To repeat the operations so that they may be clearly understood, it may be stated that when a salescheck is inserted in the sub-station machine B and the receiver 211 is removed, one thing is accomplished, to-wit, that of displaying the signal light 40 in the authorizer's office. The authorizer upon seeing the signal inserts the plug 41 and this insertion causes four operations to take place. These operations are successive but they are, practically speaking, instantaneous. First, the talking circuit is completed through the battery E. Secondly, the legend carrying drum in the sub-station machine is advanced one step to display the word "Operator". Thirdly, drum 34 is released, thus permitting the switch 57 to be actuated and a number of impulses to be sent through the magnet 56, and fourth, the accumulating or number displaying wheel in the authorizing machine is advanced by the actuation of magnet 56 and the amount to be authorized is thus displayed. The authorizer is now on the line with the receiver 208 in position and will thus receive the name and address of the customer desiring credit. The amount of credit desired is by this time displayed and the authorizer then looks up the account and if it is in good standing the salescheck inserted in the sub-station machine is authorized. If the account is questionable, it is not authorized but the legend "Customer to office" is displayed. Both operations are controlled by the authorizer and are as follows:

If the account is in good standing and the amount is to be authorized, the authorizer merely grasps the switch lever 72 and rocks it back and forth twice. This operation of the switch opens and closes the switch 57 twice and magnet 42 is therefore energized a similar number of times. The legend carrying drum is thus advanced two additional steps and the legend "Authorized" will appear in the window of the sub-station machine. The mechanism controlling the severing action of the check, the printing operation and the return of the mechanism to normal, is automatically released when the legend "Authorized" is displayed and the salesperson's only duty is then to replace the receiver 211 on the hook and to remove the upper half of the salescheck. If the account is not in good standing, switch lever 72 is merely operated once and magnet 42 will therefore only receive one impulse. The legend carrying drum is then only advanced one additional step and the legend "Customer to office" will appear. In that instance the salesperson removes the salescheck and hands the same to the customer, who is then requested to go to the main office. The receiver 211 is at the same time replaced on the hook and the entire mechanism returns to normal position as previously stated.

Having thus described my invention, what I claim and desire to secure by Letters Patent is—

1. A credit authorizing apparatus comprising a central station machine and a sub-station machine, means connecting said machines whereby certain information may be orally transmitted between the machines, means connecting said machines whereby received information may be visibly expressed, a salescheck printing mechanism in the sub-station machine, and means in the central station machine for actuating said printing mechanism.

2. In a credit authorizing apparatus of the character described, a central station and a sub-station machine, a credit amount displaying and printing mechanism in the sub-station machine, means permitting setting of the printing and displaying mechanism to a desired amount. means for displaying the same amount in the central station, and means whereby the printing operation of said mechanism will be controlled from the central station only.

3. In a credit authorizing apparatus of the character described, a central station and a sub-station machine, a credit amount displaying and printing mechanism in the sub-station machine, means permitting setting of the printing and displaying mechanism to a desired amount, means actuated thereby for visibly displaying the same amount in the central station machine, and means for actuating the printing operation of the printing mechanism from the central station machine.

4. In a credit authorizing apparatus of the character described, a central station and a sub-station machine, a credit amount displaying and printing mechanism in the sub-station machine, means permitting setting of the printing and displaying mechanism to a desired amount, means actuated thereby for visibly displaying the same amount in the central station machine, means for actuating the printing operation of the printing mechanism from the central station machine, and means for returning the printing mechanism to inoperative position upon completion of the printing operation.

5. In an apparatus of the character described a sub-station machine adapted to receive and support a salescheck, a printing mechanism in said machine, a central station machine, means in the sub-station machine for setting the printing mechanism to print a selected character, means actuated thereby for visibly displaying a similar character in the central station machine, and means actuated from the central station machine whereby the printing mechanism may be controlled.

6. In an authorizing apparatus of the character described a sub-station machine adapted to receive and support a salescheck, a printing wheel mounted in said machine, a plurality of printing faces thereon each face having different characters formed therein, means manually operated to optionally select any of said characters and to position the same in printing position, means whereby the printing operation may be controlled from a remote point and means for displaying the selected character at a remote point from which the printing operation is controlled.

7. In an authorizing apparatus of the character described a sub-station machine adapted to receive and support a salescheck, a printing wheel mounted in said machine, a plurality of printing faces thereon each face having different characters formed therein, means manually operated to optionally select any of said characters and to position the same in printing position, means whereby the printing operation may be controlled from a remote point, and means whereby said printing mechanism will be rendered inoperative unless a salescheck is placed in the machine.

8. In a credit authorizing apparatus of the character described a sub-station machine, a double salescheck insertable therein, a pair of printing wheels adapted to imprint selected characters on said salescheck, means for selecting the character to be imprinted and simultaneously turning both printing wheels to printing position, spring actuated means for rotating the printing wheels during the printing operation, and means actuated from a remote point to release the spring actuated driving means when the printing operation takes place.

9. An authorizing apparatus of the character described comprising a sub-station machine and a central station machine, means associated with the first station machine for supporting a salescheck, means connecting both stations whereby characters representing monetary values may be simultaneously displayed, and means controlled from the second station whereby a selected character may be imprinted on the salescheck.

10. In an apparatus of the character described a sub-station machine adapted to receive and support a double-sales-check, a printing mechanism in said machine, a central station machine, means in the sub-station machine for setting the printing mechanism to print a selected character, means for displaying a similar character in the central station machine, and means actuated from the central station machine whereby the printing mechanism is actuated and whereby one-half of the check is removed and placed in a receiving compartment in the sub-station machine.

11. In an apparatus of the character described, a sub-station machine adapted to receive and support a double sales-check, a printing mechanism in said machine, a central station machine, means in the sub-station machine for setting the printing mechanism to print a selected character, means for displaying a similar character in the central station machine, and means actuated from the central station machine whereby the printing mechanism is actuated and whereby one-half of the check is severed and transferred to a receiving compartment in the sub-station machine.

12. A credit authorizing apparatus comprising a central station machine and a sub-station machine, means connecting the same, printing mechanism in the sub-station machine, selective means for visibly displaying certain data in either machine and means operable upon the selection of one of the matters to be displayed to actuate the printing mechanism.

13. A credit authorizing apparatus comprising a central station machine and a sub-station machine, means connecting the same, a character bearing drum in the central station machine, a drum in the sub-station machine bearing information different from that on the first mentioned drum, means operable from the central station for rotating the drums, means for locking the drums in rotated position, and means for releasing the same.

14. A check authorizing apparatus comprising a central station machine and a sub-station machine, one of the machines adapted to receive a sales check, printing apparatus in the same machine and a character display drum associated therewith, means for setting the printing apparatus and drum to display a certain character in the said machine, means for displaying the same character in the other machine, and means operable from the latter machine for actuating the printing mechanism to impress selected data on the sales check.

15. A check authorizing apparatus comprising a central station machine and a sub-station machine, data displaying drums in each machine, means for rotating the drums to display certain data in both machines, a drum bearing legends in the sub-station machine, means operable from the central station machine for rotating the drum to visibly display certain information and a detent wheel for arresting the movement of the drums when certain selected data or information is in proper displaying position.

16. In a check authorizing apparatus comprising a central station machine and a sub-station machine, means connecting same for visibly displaying certain corresponding data in both machines, a telephone system connecting the machines, and means for rendering the telephone system inoperative until the displaying means has reached a predetermined position.

17. In a check authorizing apparatus comprising a central station machine, and a sub-station machine, means connecting the same to visibly display certain data in each machine, a telephone system connecting the machines, means for rendering the system inoperative until the displaying means has reached a predetermined position, and further means operable from the central station upon closing the circuit of the telephone system to visibly display a legend in the sub-station machine.

18. In a check authorizing apparatus comprising a central station machine and a sub-station machine, means for displaying data in both machines, a telephone system connecting the stations, means for rendering the system inoperative until the displaying means has reached a predetermined position, means for closing the telephone circuit to cause the display of a legend in the sub-station machine, and further means operable by the circuit closing means for causing the display of the data in both machines.

19. In a check authorizing apparatus comprising a central station machine and a sub-station machine, drums in the sub-station machine carrying matters to be displayed thereon, means for rotating the same, a re-setting drum, a data bearing drum in the central station, and means operable upon retrograde movement of the re-setting drum to cause rotation of the data bearing drum to display characters thereon corresponding to the characters displayed on one of the drums in the sub-station machine.

20. In a check authorizing apparatus comprising a central station machine and a sub-station machine, drums in the sub-station machine, a drum in the central station machine bearing data corresponding to the data on one of the drums in the sub-station machine, means operable from the sub-station for rotating the drums bearing corresponding data to a predetermined position to display the same in both machines, and means operable from the central station machine for imparting step by step motion to the other drum in the sub-station machine to permit selective display of legends thereon.

21. In a check authorizing machine comprising a central station machine and sub-station machines, means for visibly displaying certain data in each machine, printing mechanism in the sub-station machines comprising printing wheels, an automatically advanced, endless inking ribbon between the printing wheels, means for placing the ribbon under tension, and means for relieving the tension during the printing operation, the said printing mechanism being operable from the central station machine.

22. In a check authorizing apparatus comprising a central station machine and sub-station machines, means connecting the same for visibly displaying certain data therein, rotatable drums in the sub-station machines operable from the central station to display information, a drum in the central station rotatable with one of the drums in the sub-station machine and operable from this latter machine, and means operable upon the display of certain information on one of the drums in the sub-station machine for returning the drums to normal position.

23. In a check authorizing apparatus comprising a central station machine and a sub-station machine, means connecting the same for visibly displaying information in both machines, automatic means for releasing the displaying means when certain information has been displayed and other means for manually releasing the same when other information is displayed.

24. In a check authorizing apparatus comprising a central station machine, and sub-station machines, means connecting the same whereby information may be visibly displayed, a telephone system connecting the machines, each sub-station machine being provided with a plurality of shafts, rotatable printing wheels on each shaft, display drums on one of the shafts, and a flanged rotary drum having notches therein corresponding to the number of printing faces on the wheels, a telephone receiver hook having an arm provided with a finger disposed within the flange of the notched wheel whereby the receiver hook is normally depressed, the said hook being released from the flanged drum to close the telephone circuit when the display drums and printing wheels have been rotated to a predetermined position, the said circuit making operation being controlled from the central station.

25. In a check authorizing apparatus comprising a central station machine and sub-station machines, means for connecting the same whereby information may be visibly displayed, each sub-station machine being provided with printing wheels, display drums, and a flanged drum having notches therein, a telephone system connecting the machines, a receiver hook therefor provided with arms, a finger on one of the said arms disposed within the flange on the drum to maintain the hook in depressed position and a pin on the other arm, means for aligning the slots and finger to permit elevation of the finger carrying arm thereby closing the telephone circuit, a cam provided with a hook adapted to engage said pin to depress the receiver hook and break the telephone circuit, the said last operation being performed after the displaying operation has been completed, and means in the central station for controlling the circuit opening and closing mechanism.

26. In a check authorizing apparatus comprising a central station machine and sub-station machines, means connecting the same whereby information may be visibly displayed, each sub-station machine comprising a plurality of rotatable display drums carried by a shaft, a locking cam on the same shaft, a plate having an opening therein in each sub-station machine for supporting a sales check, a feeler carried by an arm turnably mounted in the said machine and insuring proper positioning of the sales check therein, the said locking cam engaging the arm to project the feeler through the opening in the plate when the sales check is improperly positioned in the machine or has not been inserted therein, thereby preventing operation of the machine, the sales check when properly inserted contacting with the feeler to hold the arm out of engagement with the locking cam and permitting operation of the machine.

27. In a check authorizing apparatus comprising a central station machine and sub-station machines, means connecting the same whereby visible information may be displayed, each sub-station machine comprising a shaft, printing wheels, drums, a locking cam, a flanged drum and a re-setting drum provided with an arm, mounted on the shaft, means for rotating the shaft and elements thereon, a pin on the flanged drum adapted to engage the arm on the re-setting drum for imparting rotary movement thereto, a pawl for locking the re-setting drum, and means controlled from the central station for releasing said pawl to permit return of the rotary elements to normal position.

28. In a check authorizing apparatus comprising a central station machine and sub-station machines, means connecting the same whereby visible information may be displayed, a telephone system connecting the machines, and other electrical connections between the same, display drums in the sub-station machines, corresponding number bearing drums in both machines, a magnet for operating the number bearing drum in the central station machine, a re-setting drum in the sub-station machine, an intermittently operated switch operable by the re-setting drum and in circuit with the magnet for operating the said number bearing drum, means for retarding the re-setting drum, and a single switch operable at the central station for closing the telephone circuit and the circuit of the other electrical connections to operate the information displaying means, releasing the setting drum to impart successive impulses to the magnet, and operating the number bearing drum in the central station.

ABRAHAM BLOCK.